(12) United States Patent
Sato

(10) Patent No.: US 7,266,903 B2
(45) Date of Patent: Sep. 11, 2007

(54) METHOD FOR CORRECTING THERMAL DISPLACEMENT IN A MACHINE TOOL

(75) Inventor: Reiji Sato, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 11/372,641

(22) Filed: Mar. 10, 2006

(65) Prior Publication Data
US 2006/0218811 A1    Oct. 5, 2006

(30) Foreign Application Priority Data
Mar. 31, 2005    (JP)    ............................. 2005-101479

(51) Int. Cl.
*B23Q 15/18*    (2006.01)
*B23Q 17/00*    (2006.01)
*G05B 19/404*    (2006.01)

(52) U.S. Cl. ........................................ 33/702; 700/193

(58) Field of Classification Search ................. 33/502, 33/503, 702, 703, 704; 700/193
See application file for complete search history.

(56) References Cited

U.S. PATENT DOCUMENTS

| 5,421,683 | A * | 6/1995 | Keehn .......................... 409/136 |
| 6,941,669 | B2 * | 9/2005 | Shivaswamy et al. ......... 33/502 |
| 7,024,789 | B2 * | 4/2006 | Seichter et al. ................ 33/702 |
| 2003/0065419 | A1 * | 4/2003 | Fujishima et al. ............ 700/176 |

FOREIGN PATENT DOCUMENTS

| EP | 546784 A2 * | 6/1993 |
| EP | 1128156 A1 * | 8/2001 |
| JP | 04-030941 A1 | 2/1992 |
| JP | 06190687 A * | 7/1994 |
| JP | 11104936 A * | 4/1999 |
| JP | 2001-341049 A1 | 12/2001 |
| JP | 2006212765 A * | 8/2006 |

OTHER PUBLICATIONS

"The Influence of Thermal Deformation of Machine Tools on Accuracy in Machining of Large Press Dies," Toyota Motor Corporation, Katagijutsu ("Die/Mold Technology"), vol. 18, Issue 8, pp. 44-45.
F.L.M. Delbressine, et al., "Modelling Thermomechanical Behaviour of Multi-Axis Machine Tools," Precision Engineering, 30 (2006), pp. 47-53.
J.P. Kruth et al., "Compensation of Static and Transient Thermal Errors on CMMs," Annals of the CIRP, vol. 50, Jan. 2001, pp. 377-380.

* cited by examiner

*Primary Examiner*—Alexander R. Smith
(74) *Attorney, Agent, or Firm*—Burr & Brown

(57) ABSTRACT

A thermal displacement correction method is provided, including the steps of presetting coordinate data for a fixed position of a workpiece on a table, finding an amount of displacement of the fixed position of the workpiece at a current cutting edge position based on the detected temperature, the coordinate data of the cutting edge position, and the coordinate data of the fixed position, and computing a difference in the coordinate data between the fixed position of the workpiece and the cutting edge position, finding an amount of displacement of the workpiece between its fixed position and the cutting edge position based on the detected temperature and the difference in the coordinate data between the fixed position and the cutting edge position, and computing a sum of each amount of displacement to define an estimated value and correcting thermal displacement using an NC unit based on the estimated value.

14 Claims, 7 Drawing Sheets

| | | |
|---|---|---|
| Coordinates of the fixed position of workpiece (X) | 1500 | (mm) |
| Coordinates of the fixed position of workpiece (Y) | 1000 | (mm) |
| Coefficient of linear thermal expansion of workpiece | 11 X 10$^{-1}$ | (1/°C) |
| Standard temperature | 20 | (°C) |

METHOD FOR CORRECTING THERMAL DISPLACEMENT IN A MACHINE TOOL

BACKGROUND OF THE INVENTION

This application claims the benefit of Japanese Patent Application Number 2005-101479 filed on Mar. 31, 2005, the entirety of which is incorporated by reference.

1. Field of the Invention

The present invention relates to a method for correcting thermal displacement that varies depending on a position of a tool or a workpiece in a machine tool.

2. Description of the Related Art

In a machining process of a machine tool, the machine tool and a workpiece are subject to thermal deformation due to changes of the environmental temperature of a room, heat emitted from the machine tool, and cutting heat. This thermal displacement leads to machining dimension error. As a method to reduce the dimension error, from a mechanical or structural point of view, methods to maintain a constant temperature of the machine and the workpiece have been proposed, for example, by installing the machine in a temperature-controlled room, and controlling the temperature of the cutting fluid. However, these methods require higher running costs and further have a problem in that it is difficult to set a standard temperature of the cutting fluid.

On the other hand, from the viewpoint of electrical control, a method to estimate and correct thermal displacement from temperature information or NC unit information has been proposed. The applicant of the present invention disclosed an example of this method in Japanese Published Unexamined Patent Application No. 2001-341049. This particular method includes the steps of detecting the coordinate data of machining point, that is, the coordinate data of the cutting edge position in machining (hereinafter, it is simply referred to as "cutting edge coordinate data"), and estimating thermal displacement in accordance with the coordinate data of the machining point and temperature information.

Japanese Published Examined Patent Application No. 06-61674 discloses another method that estimates the thermal displacement in accordance with the difference between a main spindle position and a standard position, as well as temperature information. Further, a document Katagijutsu (that means "die/mold technology"), Volume 18, Issue 8, Pages 44-45 discloses another method for estimating thermal displacement generated on a table of a double-column machining center in accordance with temperature information and positional information.

The above-described methods for estimating thermal displacement in accordance with temperature information or positional information from an NC unit work effectively only when a workpiece is cut on a lathe in which the fixed position of a workpiece is defined as the center of the main spindle, or only when a small workpiece is disposed on a table of a machining center and so on. However, when a relatively large workpiece such as a mold is cut, there is a problem that the thermal displacement of the workpiece varies depending on its fixed position on a table.

FIG. 9A is a schematic side view of a conventional double-column machining center. Columns 6, 6 are disposed on opposite sides of a bed 1 (in the direction orthogonal to a drawing sheet). Between the columns 6, 6, a cross rail (not shown) is bridged transversely, and a saddle 7 is mounted on the cross rail movable in the Y-axis direction orthogonal to the drawing sheet. A main spindle 8 is attached on the saddle 7 movable in the Z-axis direction that is vertical. At the distal end of the main spindle 8, a tool 9 is rotatably connected. Above the bed 1, a table 4 is disposed movable in the X-axis direction parallel to the drawing sheet, and a workpiece 5 is fixed on the table 4.

In FIGS. 9B and 9C, each cutting edge coordinate data Xa is shown at the same position. On the other hand, each coordinate data of the fixed position of the workpiece Xw is shown in different positions, for example, Xwa in FIG. 9B and Xwb in FIG. 9C. FIG. 11 shows thermal displacement change in the X-axis direction in accordance with the fixed positions in FIGS. 9A-9D at the room temperature shown in FIG. 10. FIG. 11 shows that change of the thermal displacement varies depending on the coordinate data of the fixed position even if the cutting edge coordinate data is unchanged. For this reason, in order to obtain the thermal displacement of the workpiece based on the cutting edge coordinate data only, it is necessary to change correction parameters in accordance with the coordinate data of the fixed position.

Moreover, in machining a relatively large workpiece such as a mold, when the workpiece is disposed at a place whose environmental temperature is different, there might be another problem in that the dimension and configuration of the workpiece might be different from the desired ones due to thermal deformation caused by a temperature change of the workpiece, even if the workpiece is machined in a uniform environmental temperature, such as a temperature-controlled room for example, wherein no thermal displacement is generated on the machine tool and the workpiece.

SUMMARY OF THE INVENTION

In order to solve the above problems, a method for correcting thermal displacement in accordance with a first aspect of the present invention includes the steps of: detecting temperature of each component of a machine tool; converting the detected temperature into numerical values, and estimating an amount of thermal displacement based on the numerical values of temperature and the coordinate data of the cutting edge position using a computing equation.

Moreover, the step of estimating an amount of thermal displacement further includes the steps of: presetting the coordinate data of a fixed position of the workpiece on a table (hereinafter, it is simply referred to as "the coordinate data of the fixed position" or "the coordinate data of the fixed position of the workpiece,"); computing the following values using the coordinate data of the fixed position of the workpiece:

(A) an amount of displacement of the fixed position of the workpiece at a current cutting edge position as $\Delta AB1$, (B) an amount of displacement of the workpiece between its fixed position and the current cutting edge position as $\Delta C1$, and computing a sum of $\Delta AB1$ and $\Delta C1$ to define an estimated value.

$$\text{An amount of correction of the coordinate data of the cutting edge position} = -(\Delta AB1 + \Delta C1) \qquad \text{[Equation 1]}$$

wherein, $\Delta AB1$: an amount of displacement of the fixed position of the workpiece at a current cutting edge position $\Delta C1$: an amount of displacement of the workpiece between its fixed position and the cutting edge position In addition, a method for correcting thermal displacement in accordance with a second aspect of the present invention is characterized by the following steps of:

computing an amount of displacement of the fixed position of the workpiece at the positive end position of moving distance of a cutting edge with respect to a table (hereinafter, it is simply referred to as "stroke" or "cutting stroke") as ΔAB2, and an amount of displacement of the fixed position of the workpiece at the negative end position of cutting stroke as ΔAB3 instead of ΔAB1 described above; computing an amount of displacement of the workpiece between the fixed position and the positive end position of the cutting stroke as ΔC2, and an amount of displacement of the workpiece between the fixed position and the negative end position of the cutting stroke as ΔC3 instead of ΔC1 described above; computing a sum of ΔAB2 and ΔC2 to define an estimated value at the positive end of the cutting stroke, and a sum of ΔAB3 and ΔC3 to define an estimated value at the negative end of the cutting stroke, and using two-point correction function of a servo system.

An amount of correction at the positive end of the cutting stroke=−(ΔAB2+ΔC2)  [Equation 2]

An amount of correction at the negative end of the cutting stroke=−(ΔAB3+ΔC3)  [Equation 3]

wherein:

ΔAB2: an amount of displacement of the fixed position of the workpiece at the positive end position of the cutting stroke ΔAB3: an amount of displacement of the fixed position of the workpiece at the negative end position of the cutting stroke ΔC2: an amount of displacement of the workpiece between the fixed position and the positive end position of the cutting stroke ΔC3: an amount of displacement of the workpiece between the fixed position and the negative end position of the cutting stroke It should be noted that the present invention can be easily embodied, for example, by providing an NC machine tool (a machining center) shown in FIG. 1 which is an object of thermal displacement correction, with the following: a temperature sensor; a temperature measuring device; a parameter storage device that stores each parameter, and a correction device for computing a correction value based on detected temperature and information of an NC unit. In the parameter storage device, various values are set, such as, the X-coordinates of the fixed position of the workpiece Xw, a coefficient of linear thermal expansion α, a standard temperature, the X-coordinates of the positive end position of the cutting stroke Xlp, and the X-coordinates of the negative end position of the cutting stroke Xlm.

According to a third aspect of the present invention, as a more concrete method, an amount of displacement ΔAB1 is obtained from Equation 4 by computing a sum of ΔA1, an amount of displacement of a scale between the current cutting edge position and a scale detector position (shown as A1 in FIG. 2) and ΔB, an amount of displacement of a table between a scale detector position and a fixed position of the workpiece (shown as B in FIG. 2).

ΔAB1=(ΔA1+ΔB)  [Equation 4]

wherein,

ΔA1=(a temperature for estimating thermal displacement that is obtained based on a temperature of a scale and a standard temperature)×(the coordinate data of the cutting edge position−the coordinate data of the scale detector position)×(a coefficient of linear thermal expansion of the scale)  [Equation 5]

ΔB=(a temperature for estimating thermal displacement that is obtained based on a temperature of a table and a standard temperature)×(the coordinate data of the scale detector position−the coordinate data of the fixed position of the workpiece)×(a coefficient of linear thermal expansion of the table)  [Equation 6]

Further according to a fourth aspect of the present invention, an amount of displacement ΔC1 (shown as C1 in FIG. 2) is obtained by Equation 7.

ΔC1=(a temperature for estimating thermal displacement that is obtained based on a temperature of the workpiece and a standard temperature)×(the coordinate data of the fixed position of the workpiece−the coordinate data of the cutting edge position)×(a coefficient of linear thermal expansion of the workpiece)  [Equation 7]

According to a fifth aspect of the present invention, an amount of displacement ΔAB2 is obtained from Equation 8 by computing a sum of ΔA2, an amount of displacement of the scale between the cutting edge position at the positive end of the cutting stroke and the scale detector position (shown as A2 in FIG. 3A) and AB described above (shown as B in FIG. 3A).

ΔAB2=(ΔA2+ΔB)  [Equation 8]

wherein,

ΔA2=(a temperature for estimating thermal displacement that is obtained based on a temperature of a scale and a standard temperature)×(the coordinate data of the positive end position of the cutting stroke−the coordinate data of the scale detector position)×(a coefficient of linear thermal expansion of the scale)  [Equation 9]

Similarly, an amount of displacement ΔAB3 is obtained from Equation 10 by computing a sum of ΔA3, an amount of displacement of the scale between the cutting edge position at, the negative end of the cutting stroke and a scale detector position (shown as A3 in FIG. 3B) and AB described above (shown as B in FIG. 3B).

ΔAB3=(ΔA3+ΔB)  [Equation 10]

wherein,

ΔA3=(a temperature for estimating thermal displacement that is obtained based on a temperature of a scale and a standard temperature)×(the coordinate data of the negative end position of the cutting stroke−the coordinate data of the scale detector position)×(a coefficient of linear thermal expansion of the scale)  [Equation 11]

According to a sixth aspect of the present invention, an amount of displacement ΔC2 (shown as C2 in FIG. 3A) and an amount of displacement ΔC3 (shown as C3 in FIG. 3B) are obtained from equations below.

ΔC2=(a temperature for estimating thermal displacement that is obtained based on a temperature of the workpiece and a standard temperature)×(the coordinate data of fixed position of the workpiece−the coordinate data of the positive end position of the cutting stroke)×(a coefficient of linear thermal expansion of the workpiece)  [Equation 12]

ΔC3=(a temperature for estimating thermal displacement that is obtained based on a temperature of the workpiece and a standard temperature)×(the coordinate data of fixed position of the workpiece−the coordinate data of the negative end position of the cutting stroke)×(a coefficient of linear thermal expansion of the workpiece)    [Equation 13]

It should be noted that, a standard temperature is set to be a temperature that requires dimensional accuracy of the workpiece, for example, an environmental temperature capable of measuring the dimensional accuracy of the workpiece, or an environmental temperature capable of assembling a product using the workpiece. With this setting, it is possible to machine the workpiece with dimensions that are suitable for the environmental temperature that requires dimensional accuracy, even if the machining process is conducted in a different environment.

Moreover, workpiece information, such as the coordinate data of the fixed position of the workpiece, the coefficient of linear thermal expansion of the workpiece, and the standard temperature (that requires dimensional accuracy of the workpiece) are preferably set for each workpiece by providing a setting screen on an NC unit, or are set by means of an NC program.

By setting the workpiece information such as the coordinate data of the fixed position of the workpiece, the coefficient of linear thermal expansion of the workpiece, and the standard temperature of the workpiece, it is possible to apply a correction that is suitable for environment according to the fixed position of the workpiece, the workpiece material, and a location of a machine. Moreover, by setting the workpiece information via an operation panel, the setting operation becomes easy. Further, by setting the workpiece information using NC program, correction can be applied to an unattended machining process of the workpiece.

DETAILED DESCRIPTION OF THE INVENTION

Figure 1:
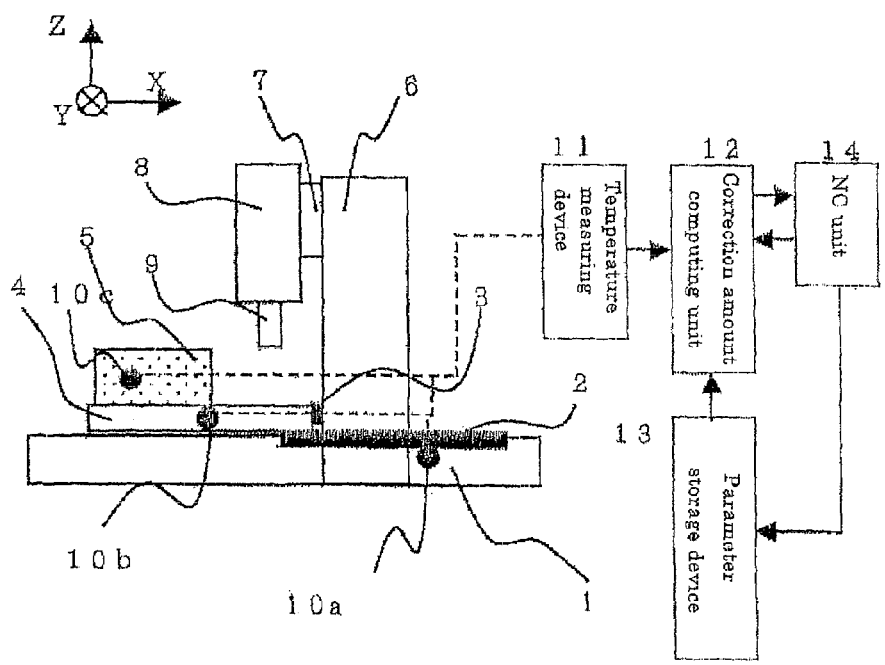
FIG. 1 is an example of a device according to one embodiment of the present invention.
Figure 2:
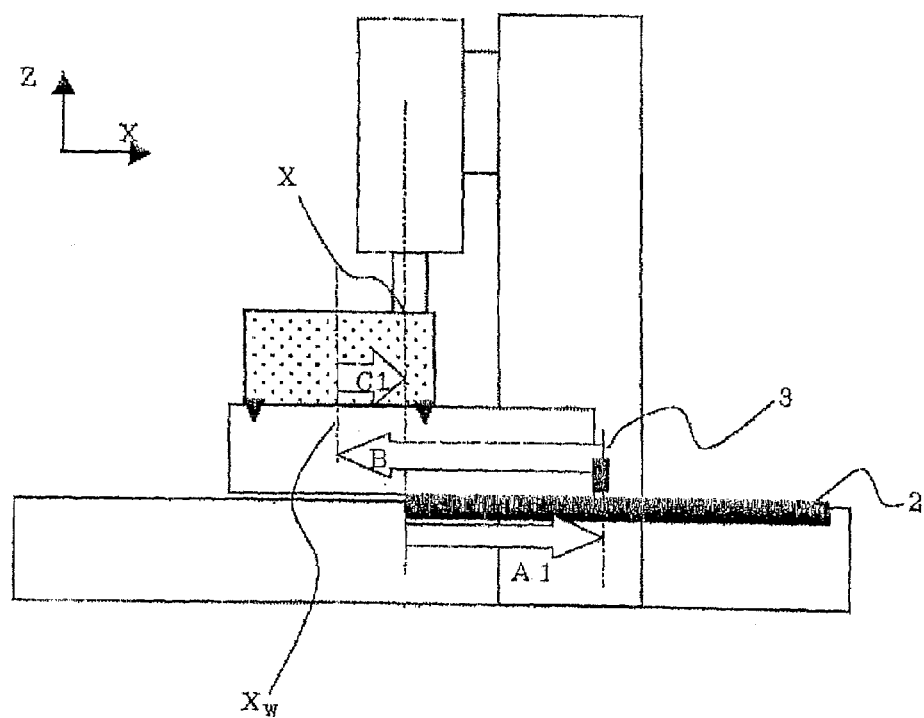
FIG. 2 is a diagram showing the relationship between the amount of displacement of a scale and the amount of displacement of a table at the coordinate data of the cutting edge position.
Figure 3A:
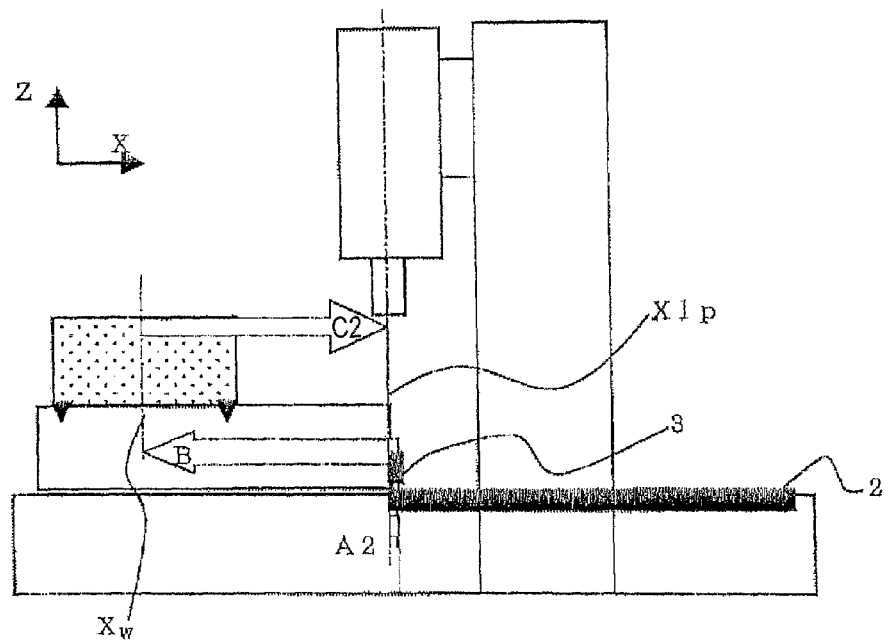
FIG. 3A is a diagram showing the relationship between the amount of displacement of a scale and the amount of displacement, of a table at the coordinate data of the positive end position of cutting stroke.
Figure 3B:
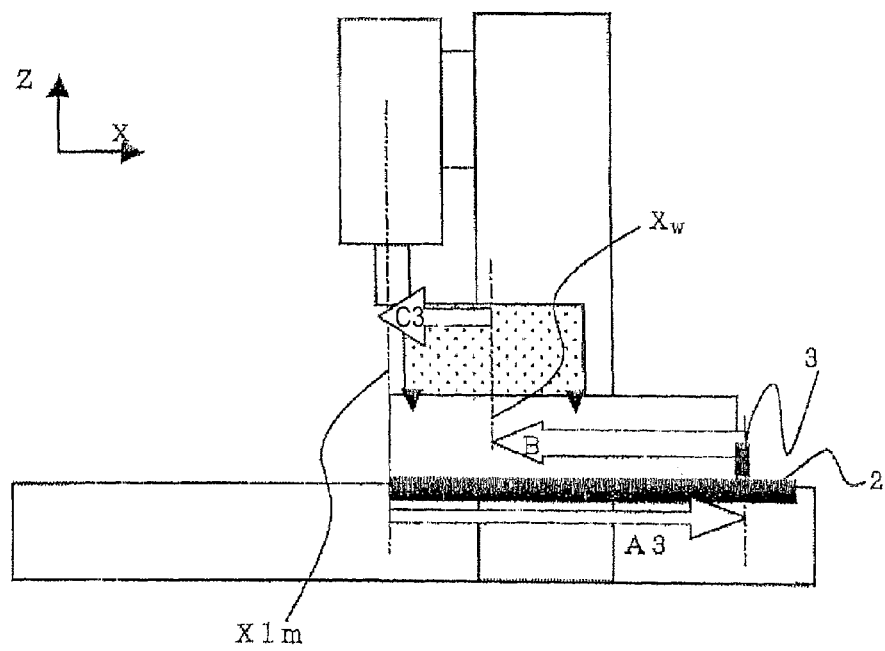
FIG. 3B is a diagram showing the relationship between the amount of displacement of a scale and the amount of displacement of a table at the coordinate data of the negative end position of the cutting stroke.

FIG. 1 is an embodiment of a device of the present invention. The device consists of an NC machine tool (machining center) that conducts thermal displacement correction, a temperature sensor, a temperature measuring device, a storage device that stores each parameter, a correction device that computes a correction value based on the detected temperature and NC unit information, and an NC unit that conducts a numerical control on the machine tool. Here, the thermal displacement in X-axis direction where the dimension of a workpiece and moving distance are large will be explained as an example.

FIG. 1 is a side schematic view of a double-column machining center. Columns 6, 6 are disposed on opposite sides of a bed 1 (in the direction orthogonal to a drawing sheet). Between the columns 6, 6, across rail (not shown) is bridged transversely, and a saddle 7 is mounted on the cross rail movable in the Y-axis direction orthogonal to the drawing sheet. A main spindle 8 is attached on the saddle 7 movable in the Z-axis direction that is vertical. At the distal end of the main spindle 8, a tool 9 is rotatably connected. Above the bed 1, a table 4 is disposed movable in the X-axis direction parallel to the drawing sheet, and a workpiece 5 is fixed on the table 4. The position of the table 4 in the X-axis direction is determined by a scale 2 disposed on the bed 1 and a scale detector 3 fixed on the table 4.

The temperature sensors are preferably disposed oil each component of the machine tool, in particular, a component that relatively moves a cutting edge and a workpiece in the axial direction to be corrected. In this embodiment, the temperature sensor 10a is disposed on the bed 1 near a scale to measure a temperature of the scale, the temperature sensor 10b is disposed on the table 4 to measure a temperature of the table, and the temperature sensor 10c is disposed on the workpiece 5 to measure a temperature of the workpiece.

Figures 4, 5:
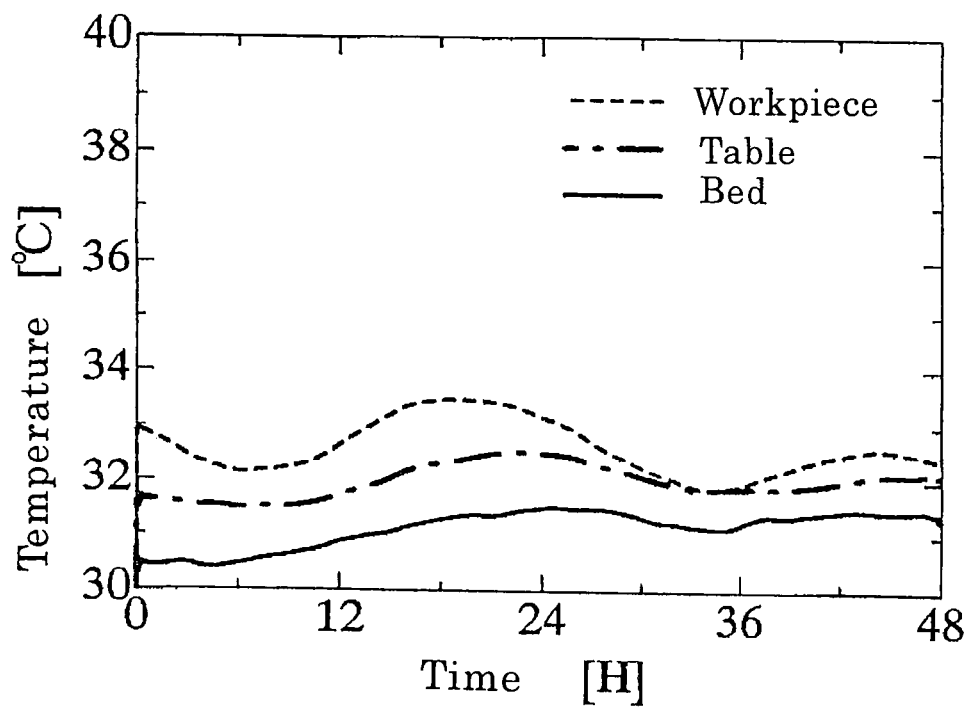
FIG. 4 is a setting screen of an NC machine tool showing the coordinate data of the fixed position of a workpiece, a coefficient, of linear thermal expansion of the workpiece, and a standard temperature.
FIG. 5 is a graph showing the temperature of a workpiece, table, and bed as an example, which are subject to correction of the thermal displacement according to the present invention.

Hereinafter, correction of the thermal displacement in the X-axis direction at the coordinate data of the fixed position of the workpiece shown in FIG. 1 using the temperature of the workpiece, table, and bed shown in FIG. 5 will be explained. In FIG. 1, the X-coordinates of the positive end position of cutting stroke Xlp, the X-coordinates of the negative end position of cutting stroke Xlm, and the X-coordinates of the fixed position of the workpiece Xw are as follows.

Xlp=6000 mm

Xlm=0 mm

Xw=1500 mm

First Embodiment

Figure 6:
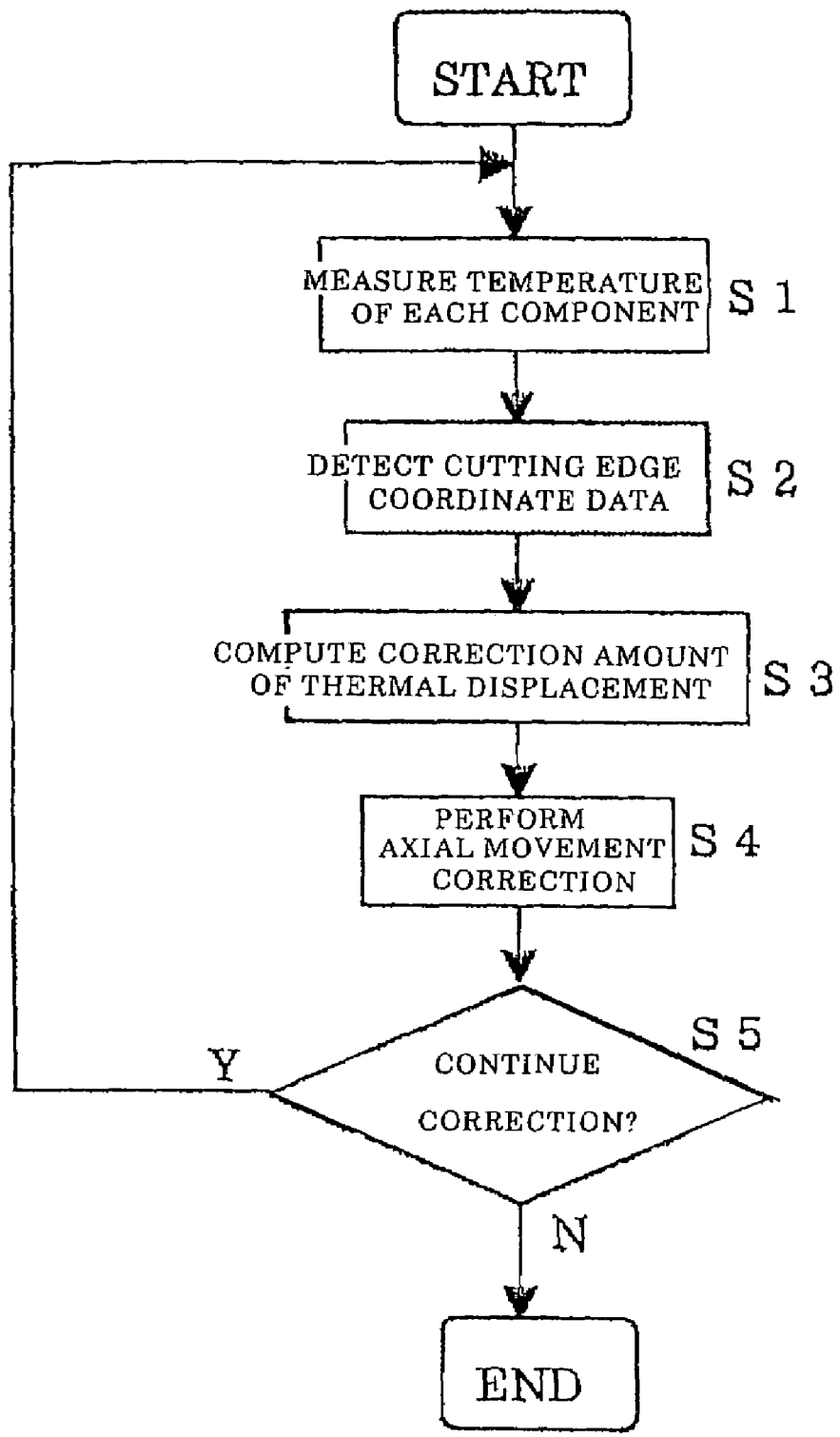
FIG. 6 is a flow chart of an embodiment of the present invention.

The first embodiment will be explained based on the flowchart shown in FIG. 6. At S1, a temperature measuring device 11 converts the analog signals into numerically expressed digital signals representing the temperatures of each sensor 10a-10c with a predetermined interval (10 seconds) by a well-known method. In a parameter storage device 13, the X-coordinates of the fixed position of the workpiece Xw, the coefficient of linear thermal expansion α, and the standard temperature are preset.

At S2, the X-coordinates of a current cutting edge position is detected by an NC unit 14. At S3, using a correction amount computing unit 12, the amount of displacement of the scale ΔA1, the amount of displacement of the table ΔB, and an amount of displacement of the workpiece ΔA2 are computed a using Equations 5, 6, and 7, respectively.

Here, as a computing method for obtaining a temperature for estimating the thermal displacement shown in the first term on the right-hand side of Equation 5, there is provided an exponential smoothing filter as shown in the Japanese Published Unexamined Patent Application No. 9-225781 filed by the present applicant. Accordingly, Equation 5 can be expressed as follows.

$$X_{7n} = Y_{7n} \cdot (X - Xs) \cdot K_7 \qquad [\text{Equation 5a}]$$

wherein, $$Y_{7n} = Y_{7n-1} + (T_{70n} - Y_{7n-1}) \cdot \alpha_7$$

$$T_{70} = T_7 - T_0$$

$$T_0 = 20$$

wherein, $X_n$: nth amount of displacement $Y_n$: nth temperature for estimating the thermal displacement $T_n$: nth input temperature α: a coefficient of a filter ($\alpha_7 = 3.2 \times 10^{-2}$)

X: the X-coordinates

Xs: the X-coordinates of a scale detector (=6000 mm)

K: a coefficient of linear thermal expansion ($K_7 = 11 \times 10^{-6}$)

Subscript 7: a scale value

Subscript 0: a standard value

Similarly, Equations 6 and 7 can be expressed as follows.

$$X_{8n} = Y_{8n} \cdot (Xs - Xw) \cdot K_8 \qquad [\text{Equation 6a}]$$

wherein, $$Y_{8n} = Y_{8n-1} + (T_{80n} - Y_{8n-1}) \cdot \alpha_8$$

$$T_{80} = T_8 - T_0$$

$$T_0 = 20$$

$$X_{2n} = Y_{2n} \cdot (Xw - X) \cdot K_2 \qquad [\text{Equation 7a}]$$

wherein, $$Y_{2n} = Y_{2-1} + (T_{20n} - Y_{2n-1}) \cdot \alpha_2$$

$$T_{20} = T_8 - T_0$$

$$T_0 = 20$$

wherein, $X_{an}$: nth amount of displacement $Y_n$: nth temperature for estimating the thermal displacement $T_n$: nth input temperature X: the X-coordinates Xs: the X-coordinates of a scale detector (=6000 mm)

α: a coefficient of a filter ($\alpha_8 = 3.2 \times 10^{-2}$, $\alpha_2 = 8.3 \times 10^{-3}$)

K: a coefficient of linear thermal expansion ($K_8 = 11 \times 10^{-6}$, $K_2 = 11 \times 10^{-6}$)

Subscript 8: a table value

Subscript 2: a workpiece value

Subscript 0: a standard value

Then, from Equations 1 and 4, the amount of correction at the X-coordinates XC is computed.

$$XC = -(X_7 + X_8 + X_2)$$

At S4, the NC unit carries out correction of the thermal displacement, moving by the amount of correction XC in the axis direction. At S5, it returns to S1 when correction is continued, or the process is finished when the correction is discontinued.

Second Embodiment

Figure 7:
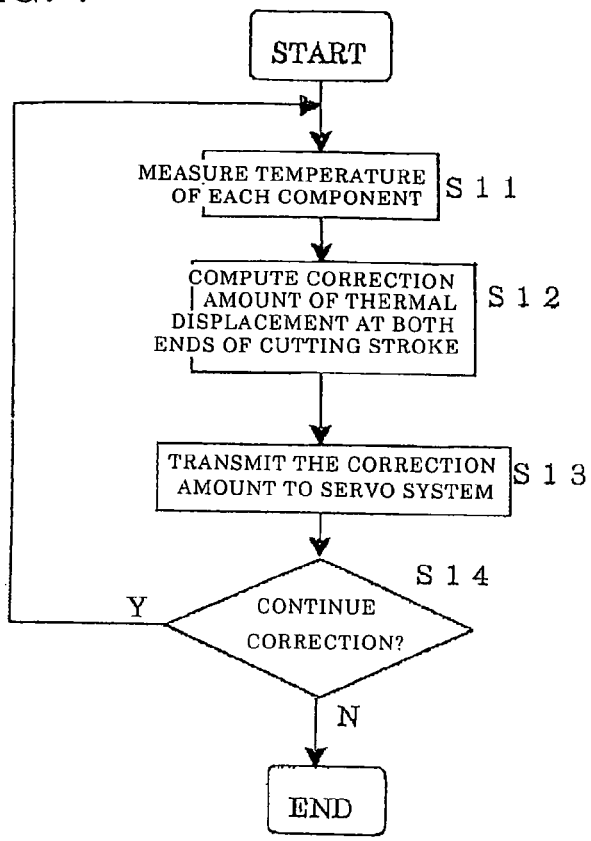
FIG. 7 is a flow chart of another embodiment of the present invention.

Another embodiment of the present invention will be explained based on a flowchart of FIG. 7. At S11, the temperature measuring device 11 converts the analog signals into numerically expressed digital signals representing the temperatures of each sensor 10*a*-10*c* with a predetermined interval (10 seconds) by a well-known method. In the parameter storage device, the X-coordinates of the positive end position of the cutting stroke Xlp, the X-coordinates of the negative end position of the cutting stroke Xlm, the X-coordinates of the fixed position of the workpiece Xw, and a standard temperature are preset.

At S12, with the correction amount computing unit 12, a correction amount XCP at the coordinate data of the positive end position of the cutting stroke is computed based on an amount of displacement of the scale ΔA2 (from Equation 9), an amount of displacement of the table ΔB (from Equation 6), an amount of displacement the workpiece ΔC2 (from Equation 12) using Equations 1 and 8.

$$XCP = -(X_9 + X_8 + X_5) \qquad [\text{Equation 1b}]$$

$$X_{9n} = Y_{9n} \cdot (Xlp - Xs) \cdot K_9 \qquad [\text{Equation 9b}]$$

$$X_{8n} = Y_{8n} \cdot (Xs - Xw) \cdot K_8 \qquad [\text{Equation 6b}]$$

$$X_{5n} = Y_{5n} \cdot (Xw - Xlp) \cdot K_8 \qquad [\text{Equation 12b}]$$

wherein, $$Y_{9n} = Y_{9n-1} + (T_{90n} - Y_{9n-1}) \cdot \alpha_9$$

$$T_{90} = T_9 - T_0$$

$$T_0 = 20$$

$$Y_{8n} = Y_{8n-1} + (T_{80n} - Y_{8n-1}) \cdot \alpha_8$$

$$T_{80} = T_8 \cdot T_0$$

$$T_0 = 20$$

$$Y_{5n} = Y_{5n-1} + (T_{50n} - Y_{5n-1}) \cdot \alpha_5$$

$$T_{50} = T_5 - T_0$$

$$T_0 = 20$$

wherein, $X_n$: nth amount of displacement $Y_n$: nth temperature for estimating the thermal displacement $T_n$: nth input temperature α: a coefficient of a filter ($\alpha_9=3.2\times10^{-2}$, $\alpha_8=3.2\times10^{-2}$, $\alpha_5=8.3\times10^{-3}$)

Xs: the X-coordinates of a scale detector (=6000 mm)

K: a coefficient of linear thermal expansion ($K_9=11=10^{-6}$, $K_8=11\times10^{-6}$, $K_5=11\times10^{-6}$)

Subscript 9: a scale value

Subscript 8: a table value

Subscript 5: a workpiece value

Subscript 0: a standard value

Similarly, a correction amount at the coordinate data of the negative end position of the cutting stroke XCM is computed based on the amount of displacement of the scale ΔA3 (from Equation 11), the amount of displacement of the table ΔB (from Equation 6), and the amount of displacement the workpiece ΔC3 (from Equation 13) using Equations 1 and 10.

$$XCM=-(X_{10}+X_8+X_6) \qquad \text{[Equation 1c]}$$

$$X_{10n}=Y_{10n}\cdot(Xlm-Xs)\cdot K_{10} \qquad \text{[Equation 11c]}$$

$$X_{8n}=Y_{8n}\cdot(Xs-Xw)\cdot K_8 \qquad \text{[Equation 6c]}$$

$$X_{6n}=Y_{6n}\cdot(Xw-Xlm)\cdot K_6 \qquad \text{[Equation 13c]}$$

wherein, $$Y_{10n}=Y_{10n-1}+(T_{100n}-Y_{10n-1})\cdot\alpha_{10}$$

$$T_{100}=T_{10}-T_0$$

$$T_0=20$$

$$Y_{8n}=Y_{8n-1}+(T_{80n}-Y_{8n-1})\cdot\alpha_8$$

$$T_{80}=T_8-T_0$$

$$T_0=20$$

$$Y_{6n}=Y_{6n-1}+(T_{60n}-Y_{6n-1})\cdot\alpha_6$$

$$T_{60}=T_6-T_0$$

$$T_0=20$$

wherein, $X_n$: nth amount of displacement $Y_n$: nth temperature for estimating the thermal displacement $T_n$: nth input temperature α: a coefficient of a filter ($\alpha_9=3.2\times10^{-2}$, $\alpha_8=3.2\times10^{-2}$, $\alpha_5=8.3\times10^{-3}$)

Xs: the X-coordinates of a scale detector (=6000 mm)

K: a coefficient of linear thermal expansion ($K_9=11\times10^{-6}$, $K_8=11\times\times10^{-6}$, $K_5=11\times10^{-6}$)

Subscript 9: a scale value

Subscript 8: a table value

Subscript 5: a workpiece value

Subscript 0: a standard value

At S13, the computed correction amounts are transmitted to a servo system. In this servo system, the correction amounts at both ends of the cutting stroke are processed with a linear interpolation method and correction is carried out in accordance with the coordinate data of the cutting edge position using a well-known two-point correction method. At S14, it returns to S11 when correction is continued, or the process is finished when the correction is discontinued.

Figure 8:
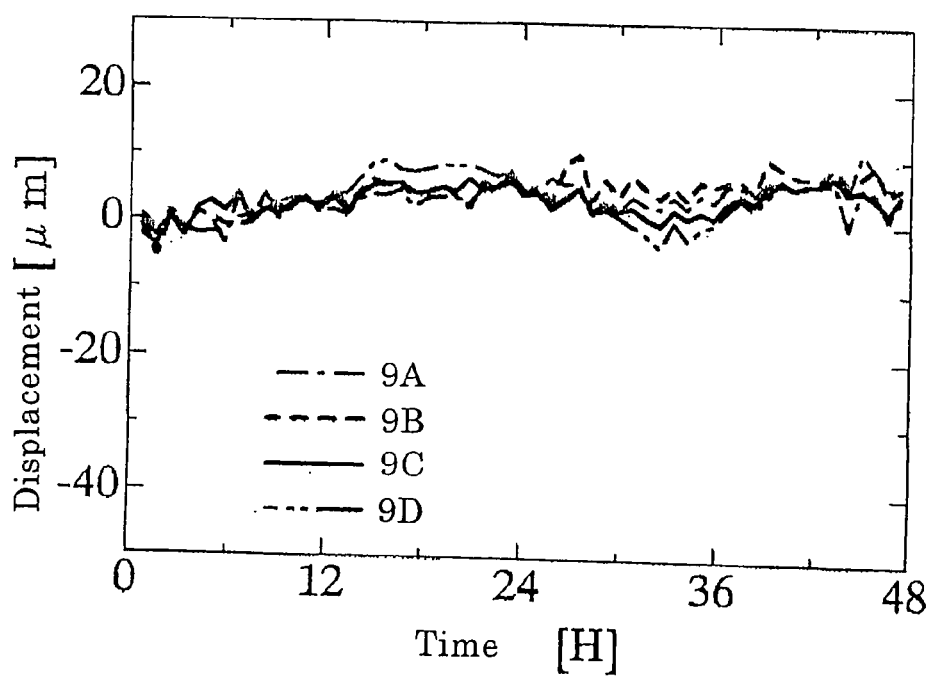
FIG. 8 is a graph showing a result of measuring the thermal displacement under the conditions during which the correction of the thermal displacement according to the present invention is conducted.
Figure 9A:
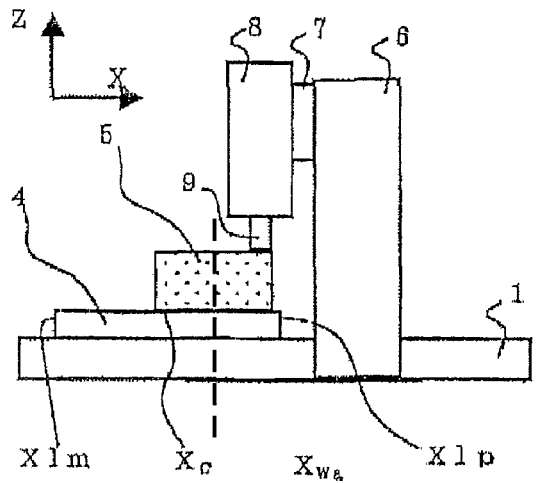
FIGS. 9A-9D are diagrams showing the relationship between the coordinate data of the fixed position of the workpiece and the coordinate data of the cutting edge position according to prior art.
Figure 9B:
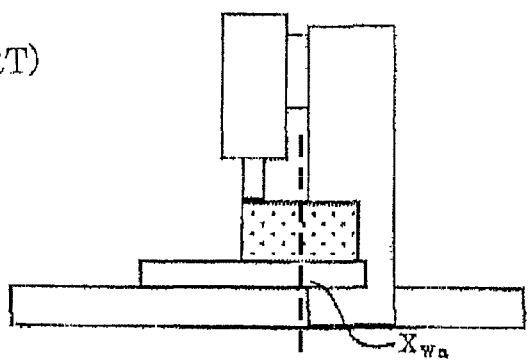
Figure 9C:
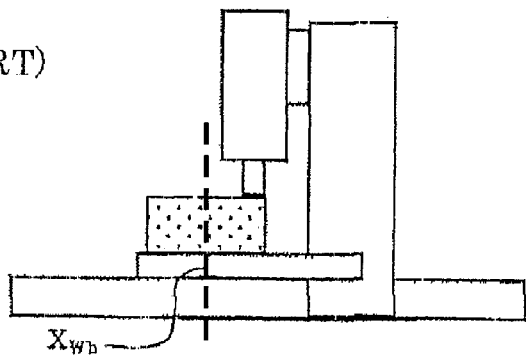
Figure 9D:
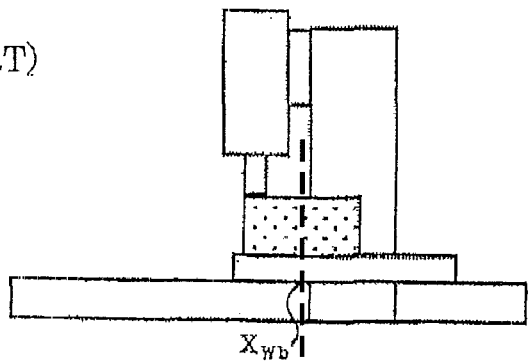
Figure 10:
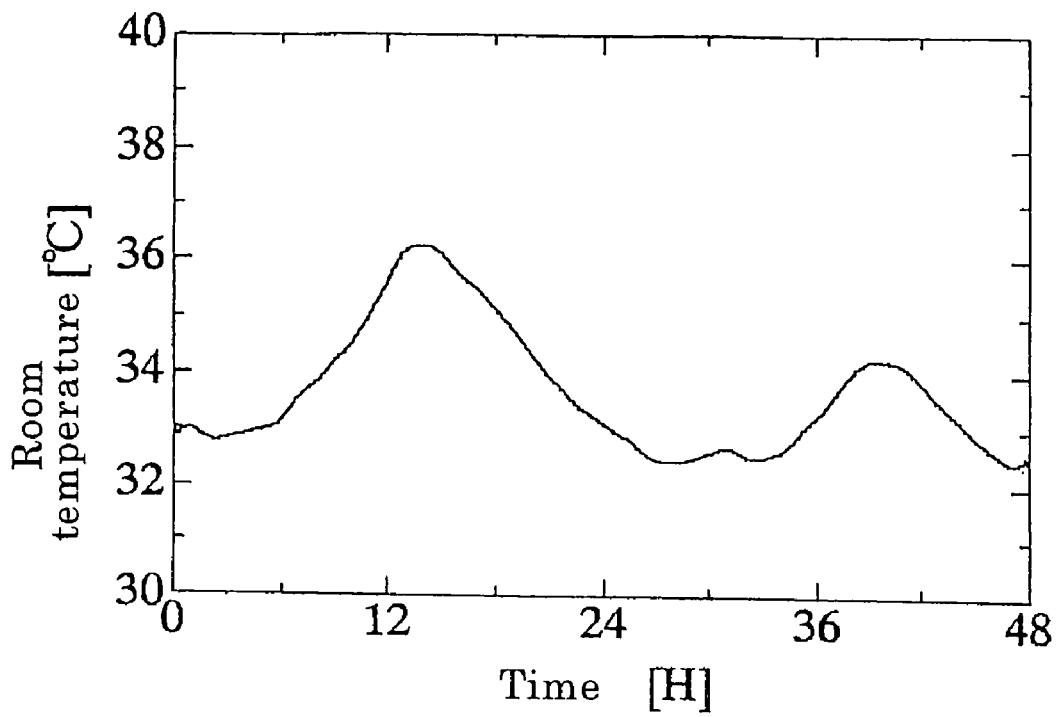
FIG. 10 is a graph showing a room temperature change in measuring the thermal displacement.
Figure 11:
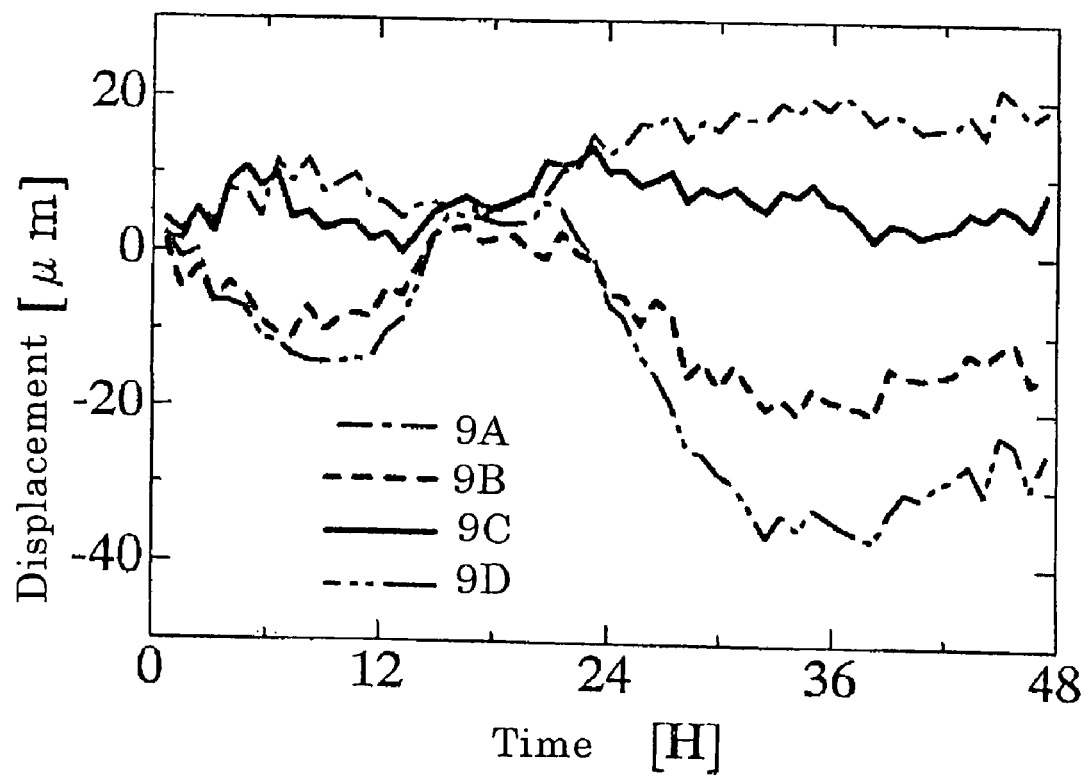
FIG. 11 is a graph showing a result of measuring the thermal displacement according to the prior art.

FIG. 8 shows a result of thermal displacement correction in the X-axis direction at each machining position of FIGS. 9A-9D using the methods of the first and second aspects of the present invention. This result shows that the thermal displacement is controlled irrespective of the cutting edge position and the fixed position of the workpiece. Although in this figure the thermal displacement in the X-axis direction is explained, the thermal displacement in the Y-axis direction can be corrected by using the temperature of the cross rail instead of the temperature of the bed. Likewise, the thermal displacement in the Z-axis direction can be corrected by using the temperature of the column instead of the bed, and the temperature of the main spindle instead of the table.

Third Embodiment

Moreover, it is required that workpiece information, such as the coordinate data of the fixed position of the workpiece, the coefficient of linear thermal expansion of the workpiece, and the standard temperature (that requires dimensional accuracy of the workpiece) are set for each workpiece to be machined. For this reason, by providing a setting screen as shown in FIG. 4 to set the information with an operation panel, the setting operation becomes easy. Further, by setting the workpiece information using NC program, the workpiece information can be set in an unattended machining process of the workpiece, for example, with an automatic pallet changer.

What is claimed is:

1. A method for correcting thermal displacement of a workpiece at a cutting edge position using a feed spindle in estimating an amount of thermal displacement based on a detected temperature obtained by detecting the temperature of each component of a machine tool and the coordinate data of the cutting edge position, the method comprising the steps of:

presetting the coordinate data of a fixed position of the workpiece on a table;

finding an amount of displacement of the fixed position of the workpiece at a current cutting edge position based on the detected temperature, the coordinate data of the cutting edge position, and the coordinate data of the fixed position of the workpiece;

computing the difference in the coordinate data between the fixed position of the workpiece and the cutting edge position;

finding an amount of displacement of the workpiece between its fixed position and the cutting edge position based on the detected temperature and the difference in the coordinate data between the fixed position of the workpiece and the cutting edge position, and computing a sum of each amount of displacement to define an estimated value and correcting thermal displacement using an NC unit based on the estimated value.

2. A method for correcting thermal displacement in a machine tool according to claim 1,
wherein the amount of displacement at the fixed position is a sum of an amount of displacement of a table and an amount of displacement of a scale in a driving system of a feed spindle to be corrected at the cutting edge position,
wherein the amount of displacement of the scale is a product of:
(A) a temperature for estimating the thermal displacement that is obtained based on the difference between a temperature of the scale and a standard temperature,
(B) the difference in the coordinate data between the cutting edge position and a scale detector position, and
(C) a coefficient of linear thermal expansion of the scale, and wherein the amount of displacement of the table is a product of:
(A) a temperature for estimating the thermal displacement that is obtained based on the difference between a temperature of the table and a standard temperature,
(B) the difference in the coordinate data between the scale detector position and the fixed position, and
(C) a coefficient of linear thermal expansion of the table.

3. A method for correcting thermal displacement in a machine tool according to claim 2,
wherein the amount of displacement of the workpiece between the fixed position and the cutting edge position is a product of:
(A) a temperature for estimating the thermal displacement that is obtained based on the difference between a temperature of the workpiece and a standard temperature,
(B) the difference in the coordinate data between the fixed position and the cutting edge position, and
(C) a coefficient of linear thermal expansion of the workpiece.

4. A method for correcting thermal displacement in a machine tool according to claim 3, wherein the standard temperature is a temperature that requires dimensional accuracy of the workpiece.

5. A method for correcting thermal displacement in a machine tool according to claim 2, wherein the standard temperature is a temperature that requires dimensional accuracy of the workpiece.

6. A method for correcting thermal displacement in a machine tool according to claim 1,
wherein the amount of displacement of the workpiece between the fixed position and the cutting edge position is a product of:
(A) a temperature for estimating the thermal displacement that is obtained based on the difference between a temperature of the workpiece and a standard temperature,
(B) the difference in the coordinate data between the fixed position and the cutting edge position, and
(C) a coefficient of linear thermal expansion of the workpiece.

7. A method for correcting thermal displacement in a machine tool according to claim 6, wherein the standard temperature is a temperature that requires dimensional accuracy of the workpiece.

8. A method for estimating thermal displacement of a workpiece at a cutting edge position in estimating an amount of thermal displacement based on detected temperature obtained by detecting the temperature of each component of a machine tool and the workpiece, and the coordinate data of the cutting edge position, the method comprising the steps of:
presetting the coordinate data of a positive end position as well as a negative end position of a cutting stroke, and the coordinate data of a fixed position of the workpiece on a table;
finding an amount of displacement of the fixed position of the workpiece at the positive end position based on the detected temperature, the coordinate data of the fixed position and the coordinate data of the positive end position;
finding an amount of displacement of the fixed position of the workpiece at the negative end position based on the detected temperature, the coordinate data of the fixed position and the coordinate data of the negative end position;
computing the difference in the coordinate data between the fixed position of the workpiece and the positive end position, and between the fixed position of the workpiece and the negative end position respectively;
finding an amount of displacement of the workpiece between the fixed position and the positive end position based on the detected temperature and the difference in the coordinate data between the fixed position of the workpiece and the positive end position;
finding an amount of displacement of the workpiece between the fixed position and the negative end position based on the detected temperature and the difference in the coordinate data between the fixed position of the workpiece and the negative end position;
computing a sum of an amount of displacement of the fixed position of the workpiece at the positive end position and an amount of displacement of the workpiece between the fixed position and the positive end position to define an estimated value at the positive end;
computing a sum of an amount of displacement of the fixed position of the workpiece at the negative end position and an amount of displacement of the workpiece between the fixed position and the negative end position to define an estimated value at the negative end, and
correcting thermal displacement by two-point correction function of a servo system based on the estimated values at the positive end as well as negative end.

9. A method for correcting thermal displacement in a machine tool according to claim 8,
wherein the amount of displacement of the workpiece at the fixed position is a sum of an amount of displacement of a table and an amount of displacement of a scale in a driving system of a feed spindle to be corrected at the positive end position and negative end position,
wherein the amount of displacement of the scale is a product of:
(A) a temperature for estimating the thermal displacement that is obtained based on the difference between a temperature of the scale and a standard temperature,
(B) the difference in the coordinate data between each end of the cutting stroke and the scale detector position, and
(C) a coefficient of linear thermal expansion of the scale, and wherein the amount of displacement of the table is a product of:
(A) a temperature for estimating the thermal displacement that is obtained based on the difference between a temperature of the table and a standard temperature, (B) the difference in the coordinate data between the scale detector position and the fixed position, and (C) a coefficient of linear thermal expansion of the table.

10. A method for correcting thermal displacement in a machine tool according to claim 9, wherein the amount of displacement of the workpiece between the fixed position and the positive end position is a product of:

(A) a temperature for estimating the thermal displacement that is obtained based on the difference between a temperature of the workpiece and a standard temperature, (B) the difference in the coordinate data between the fixed position and the positive end position, and (C) a coefficient of linear thermal expansion of the workpiece, and wherein the amount of displacement of the workpiece between the fixed position and the negative end position is a product of:

(A) a temperature for estimating the thermal displacement that is obtained based on the difference between a temperature of the workpiece and a standard temperature, (B) the difference in the coordinate data between the fixed position and the negative end position, and (C) a coefficient of linear thermal expansion of the workpiece.

11. A method for correcting thermal displacement in a machine tool according to claim 10, wherein the standard temperature is a temperature that requires dimensional accuracy of the workpiece.

12. A method for correcting thermal displacement in a machine tool according to claim 9, wherein the standard temperature is a temperature that requires dimensional accuracy of the workpiece.

13. A method for correcting thermal displacement in a machine tool according to claim 8, wherein the amount of displacement of the workpiece between the fixed position and the positive end position is a product of:

(A) a temperature for estimating the thermal displacement that is obtained based on the difference between a temperature of the workpiece and a standard temperature, (B) the difference in the coordinate data between the fixed position and the positive end position, and (C) a coefficient of linear thermal expansion of the workpiece, and wherein the amount of displacement of the workpiece between the fixed position and the negative end position is a product of:

(A) a temperature for estimating the thermal displacement that is obtained based on the difference between a temperature of the workpiece and a standard temperature, (B) the difference in the coordinate data between the fixed position and the negative end position, and (C) a coefficient of linear thermal expansion of the workpiece.

14. A method for correcting thermal displacement in a machine tool according to claim 13, wherein the standard temperature is a temperature that requires dimensional accuracy of the workpiece.

* * * * *